United States Patent [19]

Paoli

[11] Patent Number: 5,383,809
[45] Date of Patent: Jan. 24, 1995

[54] DESINEWING MACHINE FOR PRODUCING COARSE-TEXTURED MEAT

[76] Inventor: Stephen A. Paoli, c/o Stephen Paoli International Corporation, 2531 11th St., Rockford, Ill. 61104

[21] Appl. No.: 106,345

[22] Filed: Aug. 12, 1993

[51] Int. Cl.⁶ .................... A22C 17/04; B02C 23/16
[52] U.S. Cl. ........................ 452/138; 241/24
[58] Field of Search ............ 452/138, 135; 241/24, 241/68, 243

[56] References Cited

U.S. PATENT DOCUMENTS

| | | | |
|---|---|---|---|
| 1,721,281 | 7/1929 | Reid | 452/138 |
| 3,266,542 | 8/1966 | Paoli | 452/138 |
| 3,741,772 | 6/1973 | McFarland | 452/138 |
| 4,025,001 | 5/1977 | Yarem et al. | 452/138 |
| 4,042,176 | 8/1977 | Beck et al. | 452/138 |
| 4,536,920 | 8/1985 | Amersfoort | 452/138 |
| 4,685,626 | 8/1987 | Kerdiles et al. | 452/138 |
| 4,953,794 | 9/1990 | Paoli | 241/24 |
| 5,160,290 | 11/1992 | Richburg | 452/138 |

*Primary Examiner*—Willis Little
*Attorney, Agent, or Firm*—Leydig, Voit & Mayer, Ltd.

[57] ABSTRACT

Sinew is stripped from meat by the coaction of a rotatable rotor and a fixed pressure bar which are constructed so as to avoid severe pulverizing and emulsification of edible meat which remains after stripping of the sinew. The edible meat is forced through comparatively large and discrete holes in the rotor, such holes enabling the meat to retain a relatively coarse texture.

18 Claims, 6 Drawing Sheets

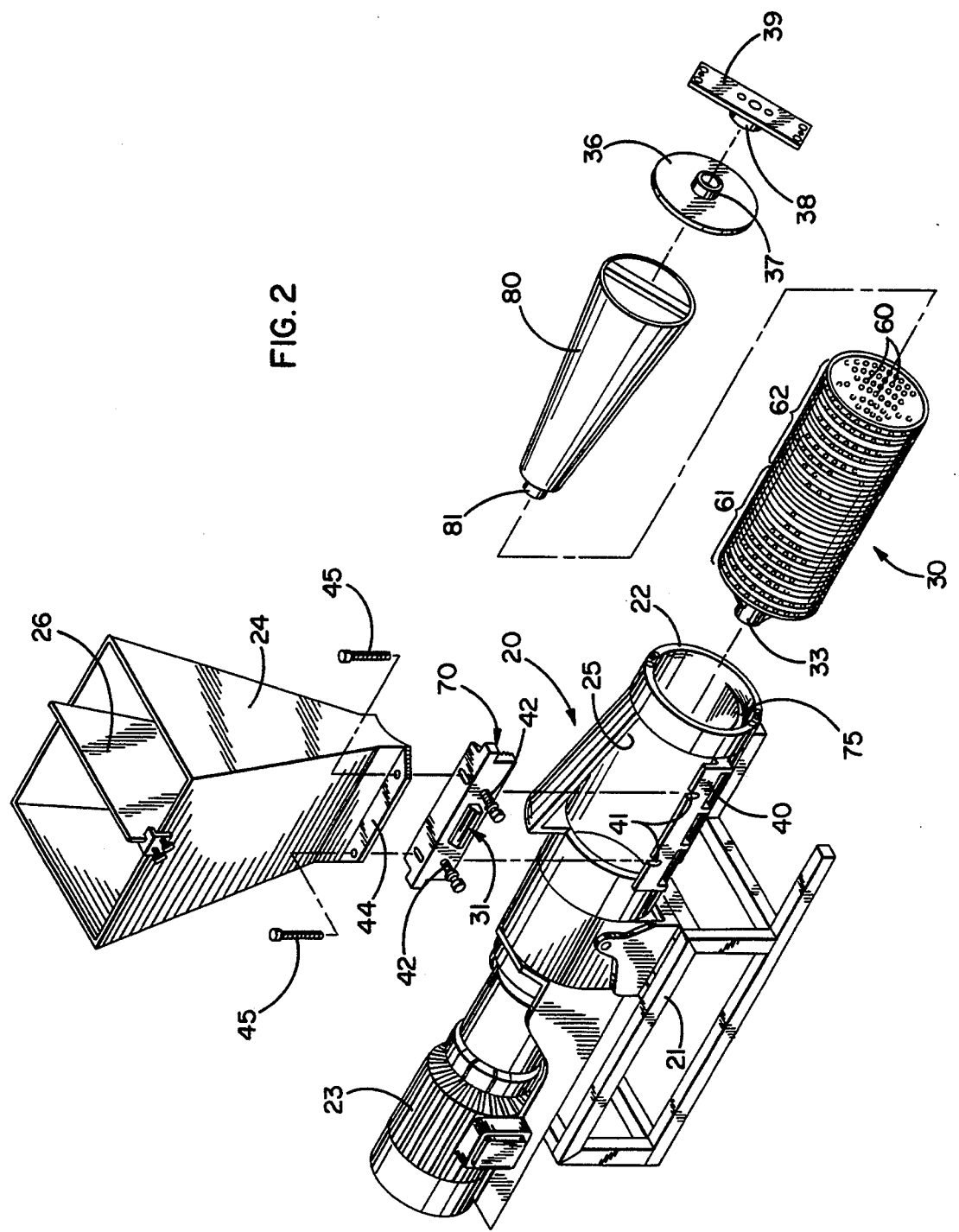

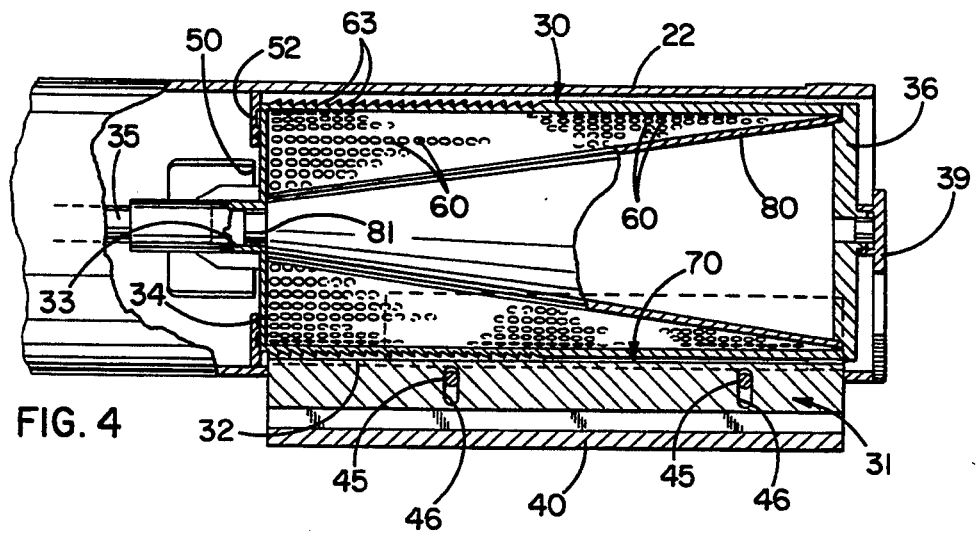
FIG. 4
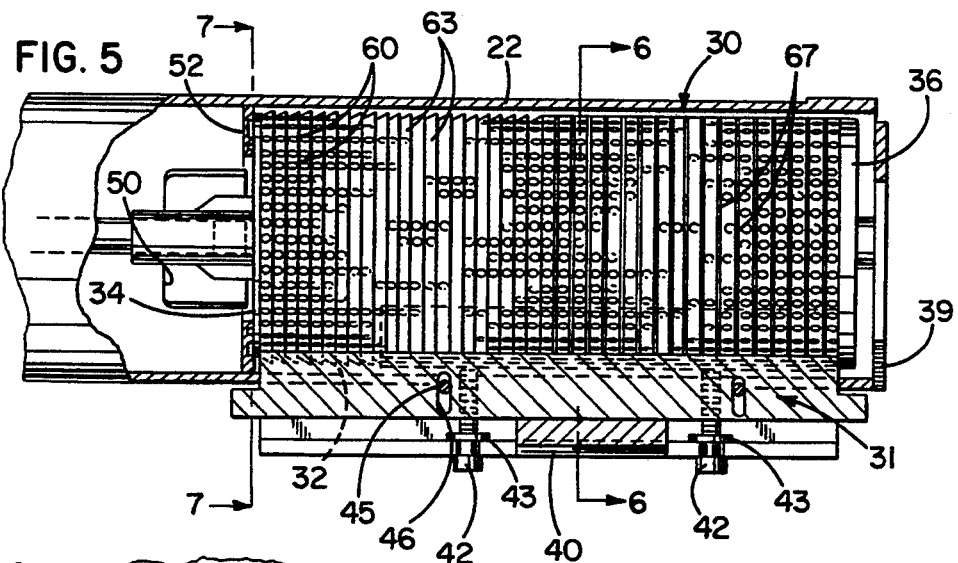
FIG. 5
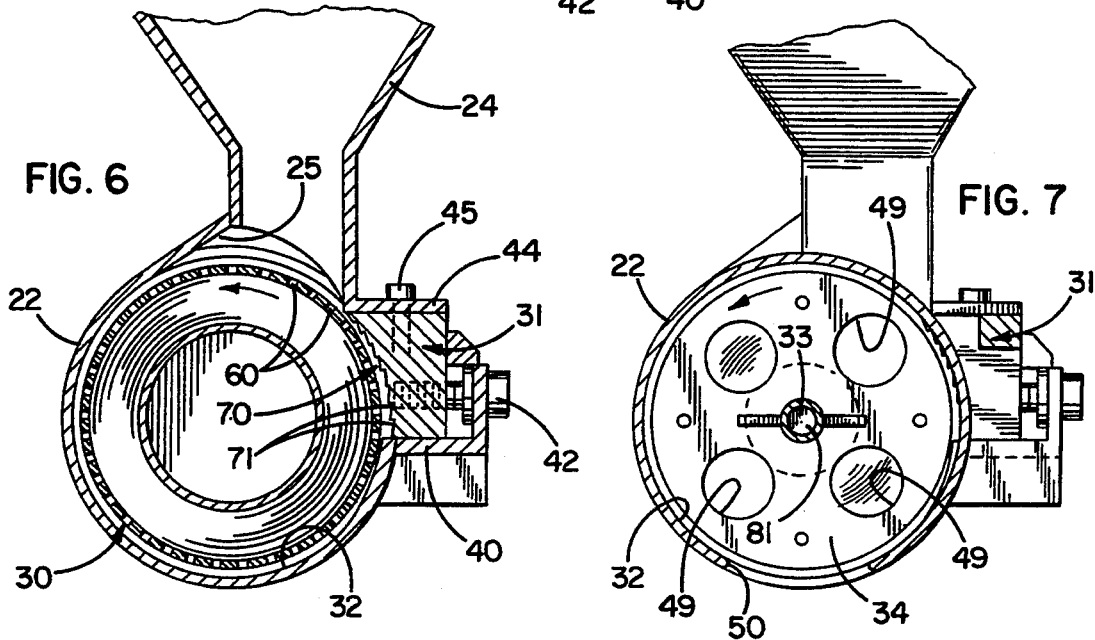
FIG. 6
FIG. 7

DESINEWING MACHINE FOR PRODUCING COARSE-TEXTURED MEAT

BACKGROUND OF THE INVENTION

This invention relates generally to meat processing machinery and, more particularly, to a mechanical desinewing machine.

In meat products of the type adapted to be processed by the machine, sinew comprises connective tissue (e.g., tendons), gristle and residual bone. Sinew is tough and is hard or stringy and must be removed from meat such as deboned beef shanks and deboned turkey drumsticks if such meat is to be sold in ground form.

Paoli U.S. Pat. No. 4,953,794 discloses a desinewing machine which, with certain products, acceptably removes the sinew. In that machine, however, the sinew is stripped from the meat by means of helical cutting elements on a rotor interdigitating with a set of teeth on a breaker bar or pressure bar. Edible meat which remains after stripping of the sinew is forced through constricted helical slots in the rotor. While such a machine functions admirably to strip the sinew, the edible meat which is produced has a very fine texture and is somewhat in the form of an emulsion. The appearance of the meat tends to lower customer appeal.

SUMMARY OF THE INVENTION

The general aim of the present invention is to provide a new and improved desinewing machine which produces a relatively coarse meat product having a texture approximating that of conventionally ground meat.

A more detailed object of the invention is to achieve the foregoing through the provision of a machine having a uniquely constructed rotor and pressure bar which coact to strip the sinew without overly pulverizing and emulsifying the edible meat.

Still another object is to provide a novel rotor having a series of discrete holes which allow edible meat to pass to the interior of the rotor in a coarse form.

A further object is to provide a unique pressure bar which coacts with the rotor to strip the sinew but which avoids severe crushing of the edible meat.

The invention also resides in the provision of a frusto-conical member located in the rotor and adapted to advance edible meat to a discharge station without churning the meat and reducing the texture thereof.

Another object of the invention is to provide an adjustable end plate for enabling the machine to produce an optimum yield of edible meat.

These and other objects and advantages of the invention will become more apparent from the following detailed description when taken in conjunction with the accompanying drawings.

BRIEF DESCRIPTION OF THE DRAWINGS

FIG. 2 is an exploded perspective view of the machine.

FIGS. 4 and 5 are enlarged fragmentary cross-sections taken substantially along the lines 4—4 and 5—5, respectively, of FIG. 3.

FIGS. 6 and 7 are fragmentary cross-sections taken substantially along the lines 6—6 and 7—7, respectively, of FIG. 5.

DETAILED DESCRIPTION OF THE PREFERRED EMBODIMENT

Figure 1:
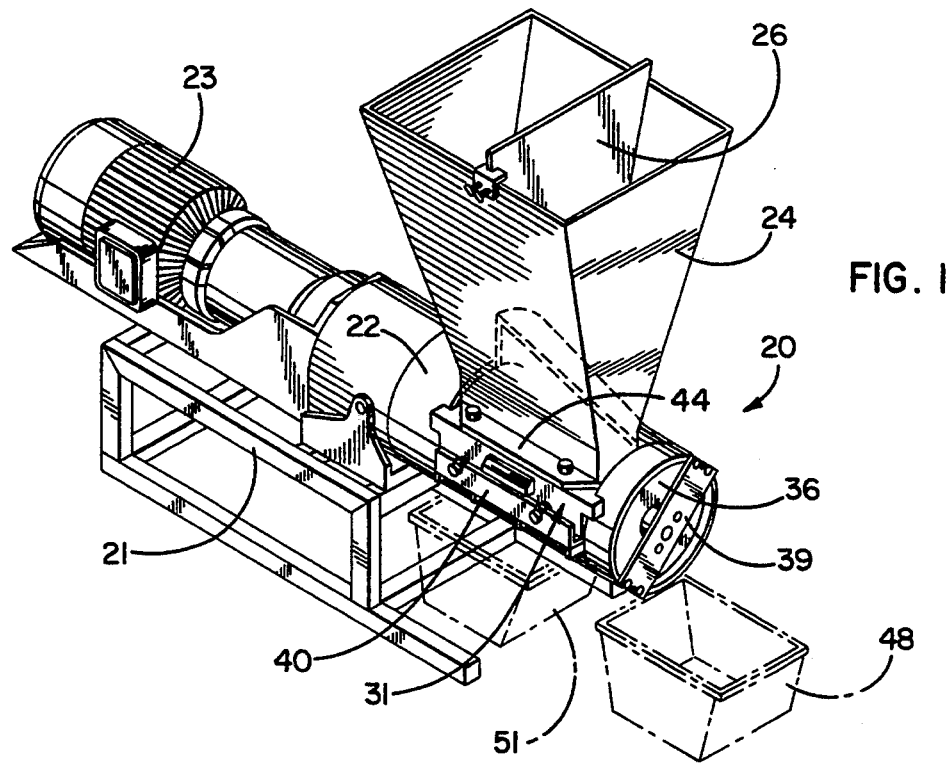
FIG. 1 is a perspective view of one embodiment of a new and improved desinewing machine incorporating the unique features of the present invention.

For purposes of illustration, the invention has been shown in the drawings as embodied in a machine 20 for stripping sinew (i.e., connective tissue, gristle and residual bone) from hunks of deboned meat products such as beef shanks and turkey drumsticks. The stripped sinew may be converted to animal food or the like while the meat from which the sinew is stripped is used for human consumption.

The machine 20 includes an optional stand 21 which serves as a mounting for a generally cylindrical housing 22 and for a drive motor 23. Located above the housing is a hopper 24 for receiving hunks of meat to be processed, part of the upper side of the housing being cut away as indicated at 25 in FIG. 2 so as to enable the hopper to communicate with the interior of the housing as best seen in FIG. 6. A partition 26 in the hopper may be adjusted longitudinally of the housing to control the quantity of meat hunks loaded into the hopper and introduced into the housing.

Figure 11:
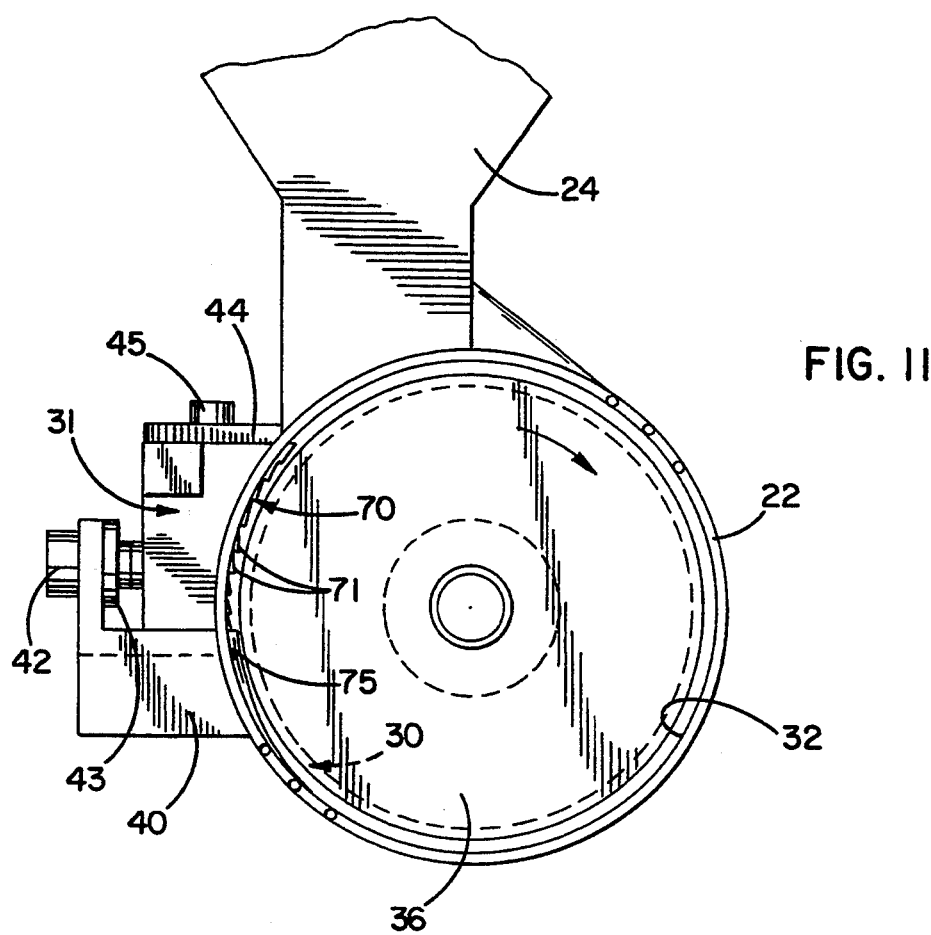
FIG. 11 is an enlarged fragmentary frontal end view of the machine.

Located within the housing 22 is a rotor 30 (FIG. 2) which coacts with a pressure bar 31 to strip sinew from the hunks of meat and to produce ground meat which is substantially free of sinew. Herein, the rotor 30 is cylindrical, is coaxial with the housing 22 and is spaced radially inwardly from the inner wall of the housing so as to create an annular space 32 between the rotor and the housing. An axially projecting sleeve 33 (FIG. 4) on a disc 34 fixed to the upstream end of the rotor is adapted to be coupled to a shaft 35 which, in turn, is coupled to the drive shaft (not shown) of the motor 23. When the motor is energized, the rotor is rotated at relatively high speed and in a clockwise direction (FIGS. 2 and 11).

The downstream end of the rotor 30 is closed by a disc 36 (FIG. 2) which carries a stub sleeve 37. The latter is journaled in a bearing 38 on a clamp bar 39 which is adapted to be bolted to the downstream end of the housing 22. By removing the clamp bar, the rotor may be pulled out of the downstream end of the housing for purposes of cleaning the rotor and the housing.

The pressure bar 31 is supported on a bracket 40 attached to one side of the housing 22 and is adapted to be adjusted transversely of the housing so as to project a selected distance into the opening 32 in the housing.

Figure 10:
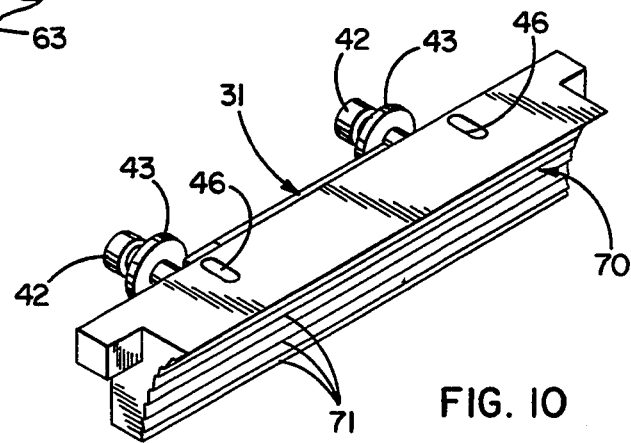
FIG. 10 is an enlarged perspective view of the pressure bar.

For this purpose, the bracket is formed with two upwardly opening notches 41 (FIG. 2) which receive screws 42 that are threaded into the pressure bar. Washers 43 (FIG. 10) fixed to the screws captivate the screws against axial movement relative to the bracket 40 and thus, when the screws are turned, the pressure bar is adjusted transversely of the housing. The hopper 24 includes a lower mounting flange 44 (FIG. 2) which rests on the upper side of the pressure bar. Screws 45 extend through holes in the flange and through transversely elongated slots 46 (FIG. 5) in the pressure bar and are threaded into the bracket 40. Because of the slots 46, the pressure bar may be adjusted without affecting the position of the hopper 24 relative to the housing 22.

Figure 3:
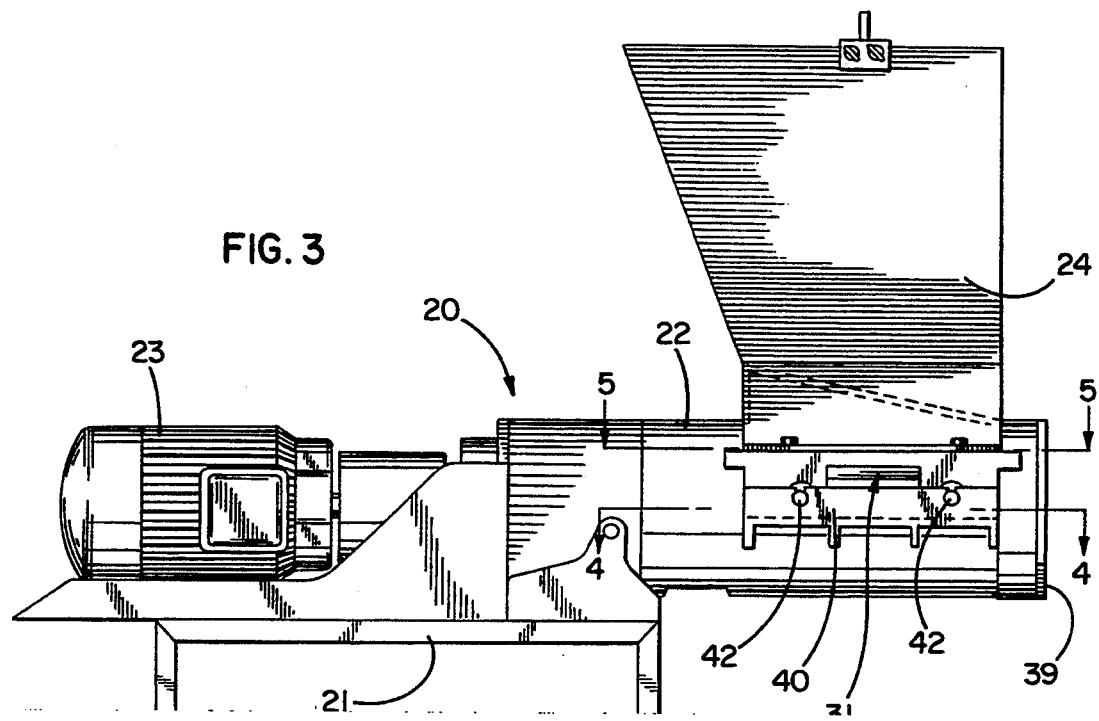
FIG. 3 is an enlarged side elevational view of the machine.

Hunks of meat which are introduced into the housing 22 from the hopper 24 impinge on the outer peripheral surface of the rotor 30 and are carried counterclockwise (FIG. 6) by the rotor toward the lower end of the pressure bar 31. As the meat passes between the rotor and the pressure bar, the tough sinew is stripped from the meat and is conveyed axially along the outer periphery of the rotor and within the annular space 32 between the rotor and the housing 22, the sinew moving downstream from left-to-right as viewed in FIGS. 1-3. Upon reaching a discharge station at the downstream end of the housing 22, the sinew spills outwardly from the space 32 and drops into a collection receptacle 48 (FIG. 1).

Tender and edible meat which remains after stripping of the sinew is forced into the interior of the rotor 30 by the pressure bar 31. Such meat is conveyed reversely, or from right-to-left as viewed in FIGS. 1-3, toward the disc 34 located at the upstream end of the rotor. The meat passes through four holes 49 (FIG. 7) in the disc and then drops downwardly through an opening 50 formed in the lower side of the housing 22 and defining a second discharge station. A receptacle 51 (FIG. 1) is located below the opening 50 to collect the edible meat discharged therefrom. Sinew is prevented from escaping from the upstream end of the annular space 32 by a ring 52 (FIG. 4) fixed within the housing 22 and located closely adjacent the disc 34.

In accordance with the present invention, the rotor 30 and the pressure bar 31 are uniquely constructed to effectively strip sinew from the hunks of meat but without significantly pulverizing and emulsifying the edible meat. As a result, the edible meat which is discharged from the machine 20 is in somewhat chunky form and is of a coarse texture approximating that of conventionally ground meat. By virtue of its coarse texture, the meat has greater consumer appeal.

In carrying out the invention, the rotor 30 is formed with a series of discrete and angularly spaced holes 60 which preferably are circular, each hole being approximately 0.40" in diameter. The array of holes extends helically around and along the rotor over substantially the entire length thereof. By virtue of the rotor being formed with discrete and relatively large holes 60, edible meat which is forced into the interior of the rotor by the pressure bar 31 remains generally coarse or chunklike and is not reduced to a fine texture.

Figure 8:
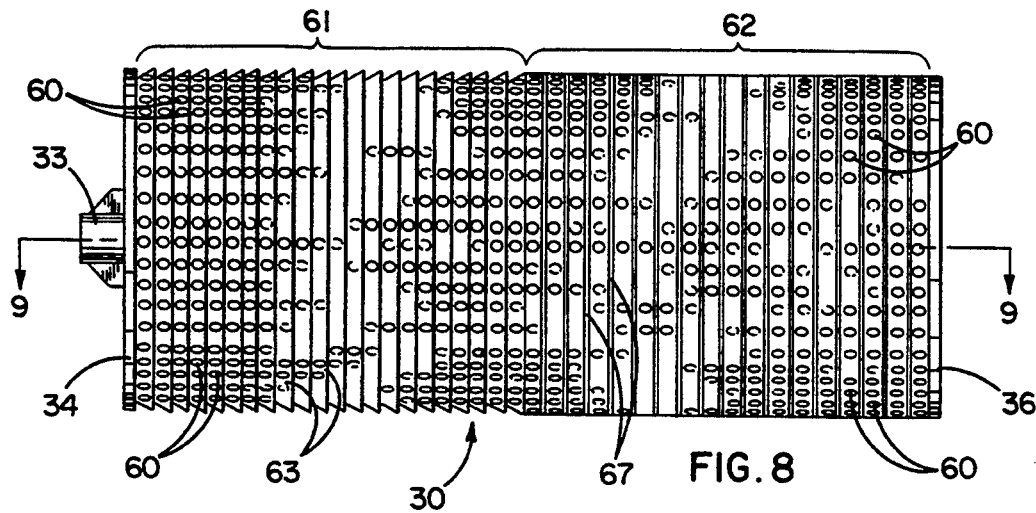
FIG. 8 is an enlarged plan view of the rotor.

In addition to the benefit afforded by the discrete holes 60, the rotor 30 and the pressure bar 31 are constructed so as to strip sinew without overly pulverizing the edible meat before the meat passes through the holes. As shown most clearly in FIGS. 8 and 9, two groups 61 and 62 of cutting and conveying elements are formed on the outer periphery of the upstream and downstream end portions, respectively, of the rotor 30. The cutting elements 61 of the first group are defined by the multiple turns 63 of a continuous and relatively deep helical groove which is cut into the outer periphery of the rotor and which extends from the upstream end of the rotor and around and along about one-half the length of the rotor. Each turn 63 is formed with an outer peripheral surface 64 (FIG. 9A) which is inclined so as to slope outwardly away from the rotor upon progressing toward the downstream end thereof. In addition, each turn 63 includes a generally radially extending surface 65 facing axially downstream and spanning the outer peripheral surface of such turn and the outer peripheral surface of the adjacent downstream turn 63. With this arrangement, the turns of the groove define sharp teeth for stripping sinew. In addition, the helical geometry of the groove causes the stripped sinew to be conveyed downstream along the outer periphery of the rotor and toward the collection receptacle 48. The helical lead of the groove is such that sinew is advanced axially through a distance of about ⅛" for each revolution of the rotor.

Because a relatively high percentage of the sinew is stripped from the meat by the upstream cutting elements 61, lesser effort is required to remove the remaining sinew. In order to strip such sinew while still further reducing pulverization of the edible meat, the cutting and conveying elements of the second group 62 on the downstream half of the rotor 30 are shallower than the first group 61 and are defined by cutting a relatively shallow helical groove in the outer periphery of the downstream half of the rotor. The turns 67 of the shallow groove are at the same lead as the upstream turns 63 but are not as pronounced or sharp as the turns 63. Accordingly, the downstream turns 67 strip and advance the sinew but the cutting action is less aggressive than that of the upstream turns 63 so that edible meat which reaches the downstream turns is not severely beaten.

Figure 9:
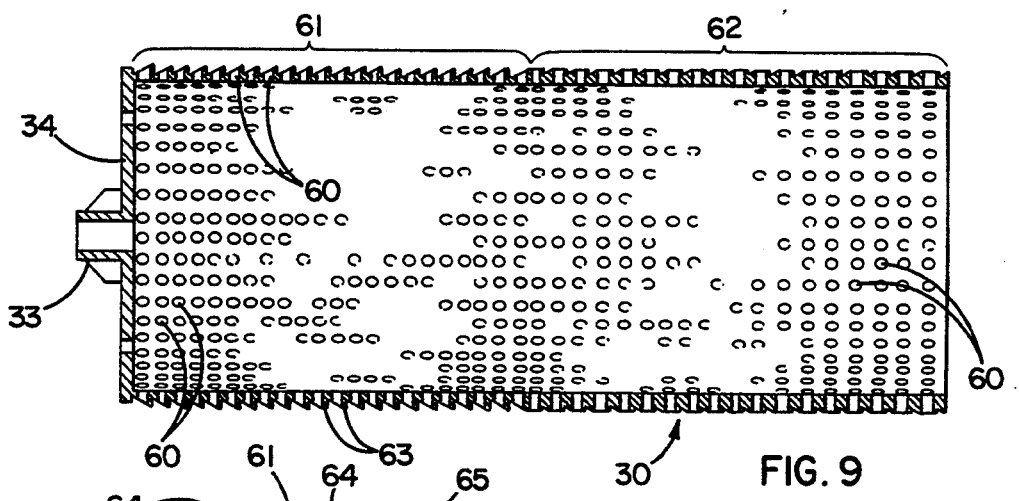
FIG. 9 is a cross-section taken substantially along the line 9—9 of FIG. 8.
Figure 9A:
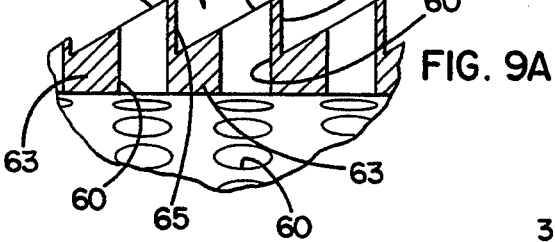
FIGS. 9A and 9B are enlarged views of certain components shown in FIG. 9.
Figure 9B:
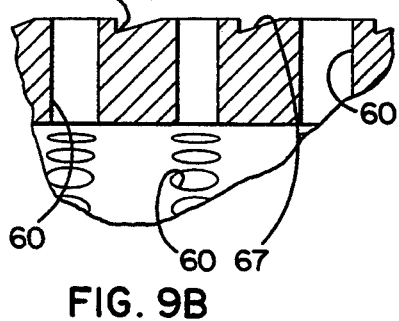

As shown most clearly in FIGS. 9, 9A, and 9B the holes 60 are located between the turns 63, 67 and are generally perpendicular to the outer peripheral surface of the rotor.

Those familiar with the art will appreciate that the rotor 30 could be provided with a helical groove which progressively decreases in depth as the groove proceeds from the upstream end of the rotor toward the downstream end thereof. Formation of such a groove, however, requires a more complex and sophisticated machine tool.

Figure 12:
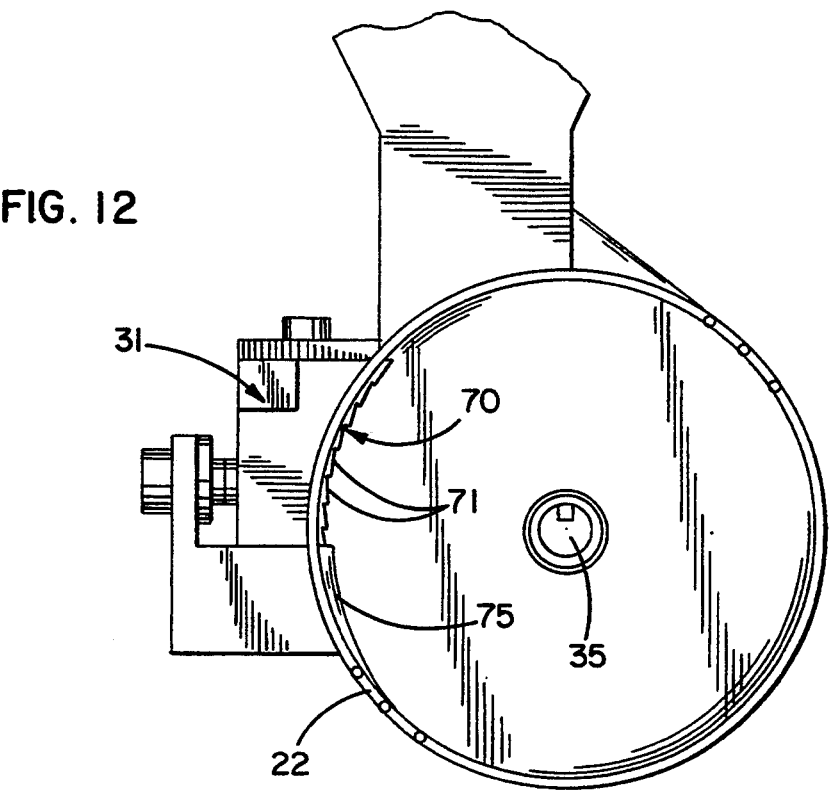
FIG. 12 is a view similar to FIG. 11 but with certain components of the machine removed for purposes of clarity.
Figure 13:
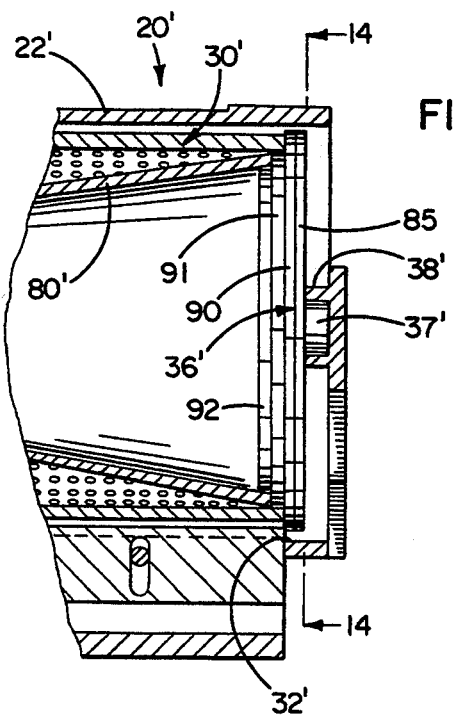
FIG. 13 is a fragmentary view somewhat similar to FIG. 4 but shows another embodiment of the machine.

The pressure bar 31 also is constructed to avoid severe crushing of the meat. To this end, the pressure bar is formed with a generally arcuate face 70 (FIG. 10) which is either concentric or substantially concentric with the outer peripheral surface of the rotor 30. The active face 70 of the pressure bar 31 is formed with a series of longitudinally extending cutting elements which herein are in the form of parallel serrations 71. As shown most clearly in FIG. 6 and in FIGS. 10-12, the depth of the serrations 71 progressively decreases in the direction of rotation of the rotor. Accordingly, the pressure bar coacts aggressively with the rotor as meat is first introduced into the radial gap between the bar and the rotor and then works with a gradually decreasing stripping action and with less pulverizing as the meat proceeds through such space.

While the face 70 of the pressure bar 31 may be precisely concentric with the outer periphery of the rotor 30, the pressure bar preferably is arranged such that there is a relatively wide gap between the rotor and the pressure bar at the lower end of the pressure bar, the gap becoming progressively narrower in the direction of rotation of the rotor. In this way, the product is capable of entering the gap and is densified upon proceeding through the gap.

In order to avoid an abrupt transition between the interior of the housing 22 and the lower end of the pressure bar 31, a curved ramp 75 (FIGS. 11 and 12) is secured to the inside of the housing and its upper end abuts the lower end of the pressure bar. As the ramp progresses downwardly from the pressure bar, it gradually tapers and ultimately feathers into the interior wall of the housing. Thus, during rotation of the rotor 30, the ramp guides the product smoothly to the pressure bar and prevents lodging and accumulation of the product against the lower end of the pressure bar.

The machine 20 is completed by means within the rotor 30 for causing the edible meat in the rotor to be conveyed from right-to-left (FIGS. 1-3) to the discharge opening 50 in the housing 22. While these means could be a stationary auger within the rotor, they preferably take the form of a frustoconical sleeve 80 (FIGS. 2 and 4) which rotates with the rotor. As shown in FIG. 4, the large end of the sleeve 80 is located adjacent the downstream end of the rotor and its outer diameter is approximately equal to the inner diameter of the rotor. The large end of the sleeve is sandwiched between the rotor and the disc 36. The small end of the sleeve is spaced a substantial distance inwardly from the rotor and includes a stub shaft 81 which projects through the disc 34 and into the sleeve 33.

As the rotor 30 rotates, the sleeve 80 causes meat within the rotor to advance from right-to-left (FIG. 4) to the discharge opening 50 for collection in the receptacle 51. It has been found that the frustoconical sleeve is superior to an auger in that meat tends to accumulate on and be churned by an auger after the machine has been in operation for a short period of time, such churning reducing the texture of the meat. With the smooth sleeve 80, the meat is not subjected to churning and thus retains a coarse texture.

To summarize, hunks of meat loaded in the hopper 24 gravitate into the housing 22 and are carried around the housing by the periphery of the rotor. The meat hunks enter the gap between the rotor and the pressure bar 31 and, as a result of the coaction of the cutting elements 61 and 62 of the rotor and the cutting elements 71 of the pressure bar, sinew is stripped from the product while edible meat is forced through the discrete holes 60 and into the rotor. The stripping action is progressive as the elements 61 and 62 convey the product between the rotor and the housing in a downstream direction and as product is repeatedly introduced into the gap between the rotor and the pressure bar. Sinew eventually is discharged from the downstream end of the housing and into the receptacle 48 while edible meat is caused to advance in the opposite direction by the frustoconical sleeve 80 and is discharged into the receptacle 51.

The texture of the edible meat is relatively coarse due to the aforementioned construction of the rotor 30 and the pressure bar 31 and because the relatively large and discrete holes 60 in the rotor allow the meat to pass into the rotor without any substantial emulsification. Accordingly, the meat produced by the present desinewing machine 20 has greater customer appeal than the fine textured meat produced by prior machines of the same general type.

Another embodiment of the machine 20' is shown in FIGS. 13-16 in which parts corresponding to those of the first embodiment are indicated by the same but primed reference numerals. The machine 20' is particularly characterized by the provision of an end plate 85 which may be selectively adjusted to control the discharge rate of the sinew and thereby control the yield of edible meat in accordance with the quality of the meat initially fed into the machine.

More specifically, the end plate 85 is a non-circular plate whose periphery projects radially outwardly into the space or gap 32' between the housing 22' and the rotor 30'. The major portion 86 of the periphery of the plate 85 is arcuate in shape while a shorter portion 87 is non-arcuately curved and feathers inwardly from the arcuate portion 86.

The plate 85 lies face-to-face against a plate 90 which forms part of a stepped disc 36' having a smaller diameter plate 91 located within the downstream end of the rotor 30' and having a still smaller diameter plate 92 located within the large end of the cone 80'. A sleeve 37' projects axially from the plate 91 of the disc 36', projects through the plate 85 and is journaled in the bearing 38'.

The plate 90 is identical in peripheral size and shape to the plate 85. Thus, the plate 90 includes a periphery having a major portion 96 which is arcuate and having a shorter non-arcuately curved portion 97.

Three screws 98 extend through three angularly and radially spaced slots 99 in the plate 85 and are threaded into the plate 90. By loosening the screws, the plate 85 may be adjusted angularly relative to the plate 90.

Figure 16:
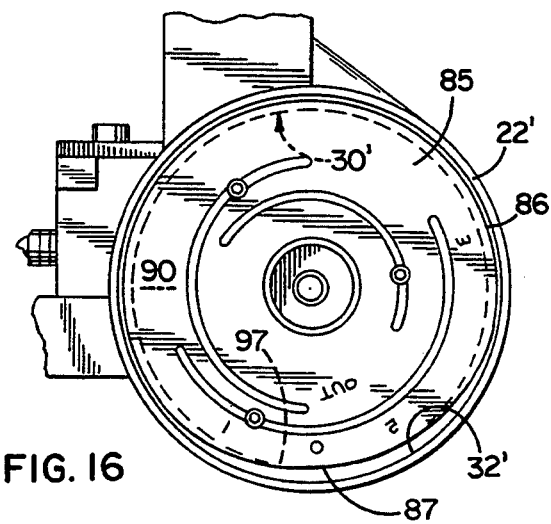

FIG. 16 shows the plate 85 adjusted to a position such that its non-arcuate portion 87 is aligned angularly with the non-arcuate portion 97 of the plate 90. When the plate 85 is in this position, the radial width of the space or gap 32' adjacent the aligned non-arcuate portions is radially wider than the gap adjacent the aligned arcuate portions 86 and 96 and thus the overall area of the discharge gap is relatively large. The plate 85 is located in this position when the percentage of sinew in the initial meat is relatively high and there is a need to discharge the sinew at a comparatively rapid rate to avoid excessive mixture of sinew with edible meat.

Figure 14:
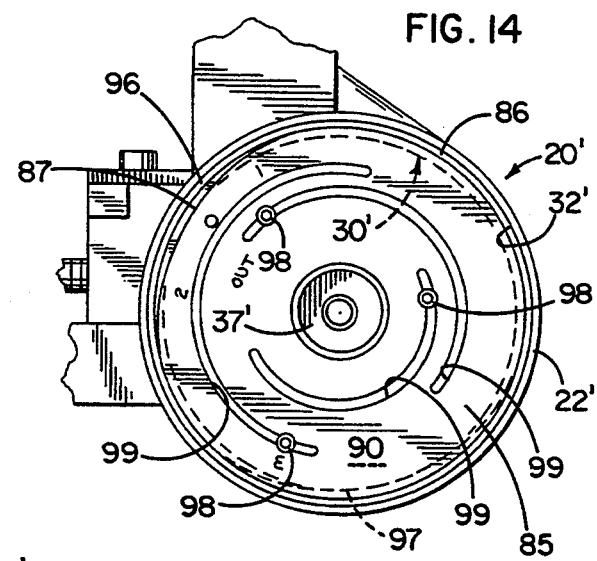
FIG. 14 is a fragmentary cross-section taken substantially along the line 14—14 of FIG. 13.

If the percentage of sinew is relatively low, the plate 85 is positioned relative to the plate 90 as shown in FIG. 14. In this position, the non-arcuate portion 87 of the plate 85 is spaced approximately 180 degrees from the non-arcuate portion 97 of the plate 90 so that the arcuate portions 86 and 96 define a full circle and cause the discharge gap 32' to be of minimum width and area. Under these conditions, the meat is retained in the machine 20' for a longer period of time so that more edible meat passes through the rotor 30' to the receptacle 51 rather than being discharged with the sinew to the receptacle 48. Thus, a greater yield of edible meat can be obtained under conditions in which the meat that is initially fed to the machine has a relatively low percentage of sinew.

Figure 15:
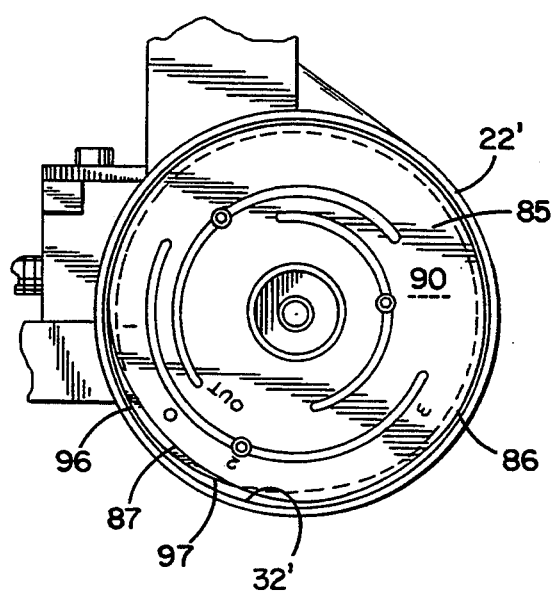
FIGS. 15 and 16 are views similar to FIG. 14 but shows successively moved positions of the adjustable end plate.

FIG. 15 shows the plate 85 adjusted so that its non-arcuate portion 87 is only partially aligned with the non-arcuate portion 97 of the plate 90 such that the area of the gap 32' is smaller than the gap area of FIG. 16 but is larger than the gap area of FIG. 14. This setting may be used for medium quality meat, and the area of the gap may be progressively adjusted between the extremes shown in FIGS. 14 and 16 by changing the position of the plate 85 progressively in one direction or the other from the intermediate position of FIG. 15.

I claim:

1. A machine for stripping sinew from relatively large meat hunks and for producing substantially smaller pieces of coarsely ground meat, said machine comprising an elongated outer housing of circular cross-section, a hollow rotor of circular cross-section rotatably supported within and spaced radially inwardly from said housing, means for rotating said rotor about a predetermined axis, means for introducing meat hunks into the space between said housing and said rotor, a series of cutting and conveying elements extending helically around and along said rotor, a pressure bar coacting with said cutting and conveying elements to strip sinew from the hunks introduced into said space, said cutting and conveying elements advancing the stripped sinew along the exterior of said rotor to a first discharge station, a series of discrete holes formed through said rotor adjacent said cutting and conveying elements, said holes being generally circular and being closely spaced from one another along a helix extending around and along said rotor and between said cutting and conveying elements, small pieces of meat being formed and being forced through said holes and into the interior of said rotor as the sinew is stripped from said hunks, and means located within said rotor for causing said small pieces of meat to advance to a second discharge station remote from said first station.

2. A machine as defined in claim 1 in which said rotor includes an upstream end portion and a downstream end portion, said cutting and conveying elements advancing the stripped sinew from the upstream end portion of the rotor toward the downstream end portion thereof, there being first and second groups of cutting and conveying elements on the upstream end portion and on the downstream end portion, respectively, of said rotor, the first group of elements defining pronounced edges, said second group of elements defining less pronounced edges.

3. A machine as defined in claim 2 in which the cutting elements of said first group are defined by a multiple turn helix having an outer peripheral surface which is inclined so as to slope outwardly from said rotor upon progressing toward the downstream end portion of the rotor, each turn of said helix having a generally radial surface extending between the outer peripheral surface of such turn and the outer peripheral surface of the adjacent downstream turn.

4. A machine as defined in claim 3 in which each element of said second group also is defined by a multiple turn helix.

5. A machine as defined in claim 1 in which said housing includes an inner wall which is substantially cylindrical, said pressure bar projecting into said housing and having a lower end, and a circumferentially extending ramp on a portion of said inner wall adjacent the lower end of said pressure bar, said ramp being shaped to avoid an abrupt transition between the inner wall of said housing and the lower end of said pressure bar.

6. A machine for stripping sinew from relatively large meat hunks and for producing substantially smaller pieces of coarsely ground meat, said machine comprising an elongated outer housing of circular cross-section, a hollow rotor of circular cross-section rotatably supported within and spaced radially inwardly from said housing, means for rotating said rotor about a predetermined axis, means for introducing meat hunks into the space between said housing and said rotor, a series of cutting and conveying elements extending helically around and along said rotor, a pressure bar coacting with said cutting and conveying elements to strip sinew from the hunks introduced into said space, said pressure bar including a generally arcuate concave surface substantially concentric with and facing said rotor, a series of substantially parallel cutting elements extending generally axially along said arcuate surface and projecting radially toward said rotor, the cutting elements of said pressure bar coacting with the cutting elements of said rotor to strip sinew from said hunks of meat and to form said hunks into relatively small pieces, said cutting and conveying elements advancing the stripped sinew along the exterior of said rotor to a first discharge station, a series of discrete holes formed through said rotor adjacent said cutting elements, said holes being closely spaced from one another along a helix extending around and along said rotor, small pieces of meat being formed and being forced through said holes and into the interior of said rotor as the sinew is stripped from said hunks, and means located within said rotor for causing said small pieces of meat to advance to a second discharge station remote from said first station.

7. A machine as defined in claim 6 in which the cutting elements of said pressure bar are defined by a series of serrations, the depth of said serrations decreasing progressively in the direction of rotation of said rotor.

8. A machine as defined in claim 6 in which said arcuate surface of said pressure bar is concentric with said rotor.

9. A machine as defined in claim 6 in which the arcuate surface of said pressure bar becomes progressively closer to said rotor in the direction of rotation of said rotor.

10. A machine for stripping sinew from relatively large meat hunks and for producing substantially smaller pieces of coarsely ground meat, said machine comprising an elongated outer housing of circular cross-section, a hollow rotor of circular cross-section rotatably supported within and spaced radially inwardly from said housing, means for rotating said rotor about a predetermined axis, means for introducing meat hunks into the space between said housing and said rotor, a series of cutting and conveying elements extending helically around and along said rotor, a pressure bar coacting with said cutting and conveying elements to strip sinew from the hunks introduced into said space, said cutting and conveying elements advancing the stripped sinew along the exterior of said rotor to a first discharge station, a series of discrete holes formed through said rotor adjacent said cutting elements, said holes being closely spaced from one another along a helix extending around and along said rotor, small pieces of meat being formed and being forced through said holes and into the interior of said rotor as the sinew is stripped from said hunks, and means located within said rotor for causing said small pieces of meat to advance to a second discharge station remote from said first discharge station, there being a radial gap between said housing and said rotor, and means for adjusting the area of said gap adjacent said first discharge station.

11. A machine as defined in claim 10 in which said adjusting means include means for adjusting the radial width of at least part of said gap adjacent said first discharge station.

12. A machine as defined in claim 10 in which said means comprise a first plate fixed to one end of said rotor and projecting radially into said gap adjacent said first discharge station, a second plate connected to said first plate and projecting radially into said gap adjacent said first discharge station, and means for angularly adjusting said second plate relative to said first plate.

13. A machine as defined in claim 12 in which each of said plates includes an outer periphery having an arcuately curved portion and a non-arcuately curved portion, said non-arcuately curved portions of said plates being aligned angularly with one another when said second plate is adjusted to a first predetermined angular position relative to said first plate and causing said gap adjacent said first discharge station to be of maximum area, said non-arcuately curved portion of said second plate progressively moving out of alignment with said non-arcuately curved portion of said first plate during progressive angular adjustment of said second plate relative to said first plate toward a second predetermined position and causing the area of said gap adjacent said first discharge station to progressively decrease.

14. A machine for stripping sinew from relatively large meat hunks and for producing substantially smaller pieces of coarsely ground meat, said machine comprising an elongated outer housing of circular cross-section, a hollow rotor of circular cross-section rotatably supported within and spaced radially inwardly from said housing, said rotor having an upstream end portion and a downstream end portion, means for rotating said rotor about a predetermined axis, means for introducing meat hunks into the space between said housing and said rotor, first and second groups of cutting and conveying elements on the upstream end portion and on the downstream end portion, respectively, of said rotor and extending helically around and along said rotor, a pressure bar coacting with said cutting and conveying elements to strip sinew from the hunks introduced into said space, said cutting and conveying elements advancing the stripped sinew along the exterior of said rotor from the upstream end portion of said rotor toward the downstream end portion thereof and to a first discharge station, the cutting and conveying elements of said first group defining a multiple turn helix having an outer peripheral surface which is inclined so as to slope outwardly from said rotor upon progressing toward the downstream end portion of the rotor, each turn of said helix having a generally radial surface extending between the outer peripheral surface of such turn and the outer peripheral surface of the adjacent downstream turn, a series of discrete holes formed through said rotor adjacent said cutting and conveying elements, said holes being closely spaced from one another along a helix extending around and along said rotor, small pieces of meat being formed and being forced through said holes and into the interior of said rotor as the sinew is stripped from said hunks, and means located within said rotor for causing said small pieces of meat to advance to a second discharge station remote from said first station.

15. A machine as defined in claim 14 in which the cutting and conveying elements of said first group define pronounced edges, the cutting and conveying elements of said second group defining less pronounced edges.

16. A machine as defined in claims 14 in which each element of said second group also is defined by a multiple turn helix.

17. A machine as defined in claim 16 in which said holes are generally circular and are located between said cutting elements.

18. A machine for stripping sinew from relatively large meat hunks and for producing substantially smaller pieces of coarsely ground meat, said machine comprising an elongated outer housing of circular cross-section, a hollow rotor of circular cross-section rotatably supported within and spaced radially inwardly from said housing, said rotor including an upstream end portion and a downstream end portion, means for rotating said rotor about a predetermined axis, means for introducing meat hunks into the space between said housing and said rotor, a series of cutting and conveying elements extending helically around and along said rotor, a pressure bar coacting with said cutting and conveying elements to strip sinew from the hunks introduced into said space, said cutting and conveying elements advancing the stripped sinew along the exterior of said rotor from the upstream end portion of said rotor toward the downstream end portion thereof and to a first discharge station, a series of discrete holes formed through said rotor adjacent said cutting elements, said holes being closely spaced from one another along a helix extending around and along said rotor, small pieces of meat being formed and being forced through said holes and into the interior of said rotor as the sinew is stripped from said hunks, and means located within said rotor for causing said small pieces of meat to advance to a second discharge station remote from said first station, said means located within said rotor comprising a hollow frustoconical conical member having small and large ends located adjacent the upstream and downstream end portions, respectively, of said rotor, said frustoconical member being operable to cause small pieces of meat within said rotor to advance from the downstream end of the rotor toward the upstream end thereof.

* * * * *